United States Patent [19]

Deflandre et al.

[11] 4,129,360
[45] Dec. 12, 1978

[54] HELIOSTATS

[75] Inventors: Jean Deflandre; Pierre Matarasso; Jean-Pierre Traisnel, all of Paris, France

[73] Assignee: Agence Nationale de Valorisation de la Recherche (ANVAR), Seine, France

[21] Appl. No.: 764,423

[22] Filed: Jan. 31, 1977

[30] Foreign Application Priority Data

Feb. 9, 1976 [FR] France .................................. 76 03447

[51] Int. Cl.² ................................................ G02B 5/08
[52] U.S. Cl. ..................................... 350/289; 126/270; 350/293; 353/3
[58] Field of Search ................. 126/270, 271; 350/289, 350/292, 293; 353/3; 250/203 R

[56] References Cited

U.S. PATENT DOCUMENTS

| 514,669 | 2/1894 | Allingham | 353/3 X |
| 811,274 | 1/1906 | Carter | 126/271 |
| 2,712,772 | 7/1955 | Trombe | 353/3 |
| 3,884,217 | 5/1975 | Wartes | 126/270 |

FOREIGN PATENT DOCUMENTS 738406 10/1932 France ..................................... 126/271

Primary Examiner—F. L. Evans

[57] ABSTRACT

A heliostat comprises a tubular chassis having a triangular base mounted to pivot about a substantially vertical axis and provided with an oblique support mounted at a point of the triangular base in order to pivot about a horizontal axis. A reflecting panel is pivoted on the base and is slidably attached to an oblique bar in order to fix the panel to the base and orientate the latter as regards altitude. Wheels are provided on the base to unable the chassis to travel on a circular track for orientation as regards azimuth. An application for the heliostat is the recovery of solar energy.

5 Claims, 1 Drawing Figure

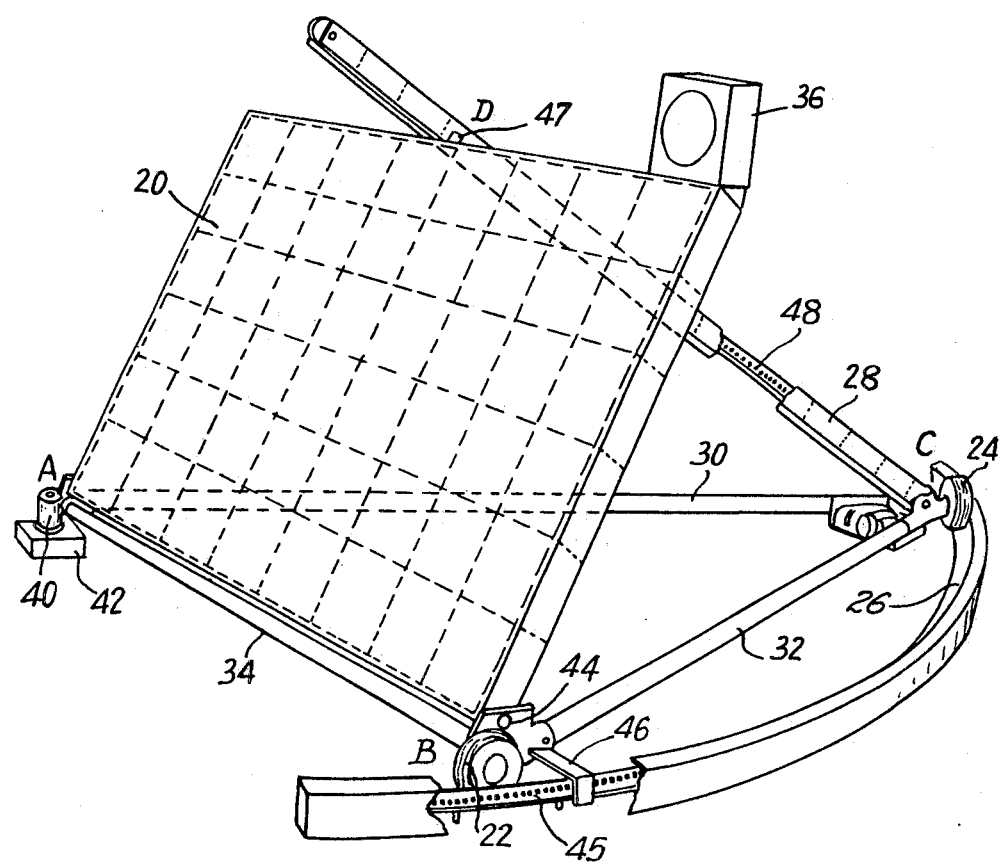

HELIOSTATS

The present invention relates to a new heliostat structure.

It will be recalled that a heliostat is essentially a mirror whose orientation is permanently controlled in order that the solar radiation is always reflected towards a fixed focal point (where a boiler for recovering the radiated energy is located) despite the variation of position of the sun during the day.

There are several types of known heliostat structures.

The conventional altazimuthal mounting is known, which is capable of carrying out the orientation of a panel both as regards azimuth and altitude, by virtue of a construction comprising two perpendicular shafts (horizontal shaft placed on a fork, itself mounted on a vertical pivot).

This structure has the drawback of being particularly sensitive to deflections due in particular to the wind, which exerts a horizontal thrust on the reflecting surface (which has large dimensions). Therefore, the radiation is not always reflected in the correct direction. In particular, a considerable deflection as regards altitude may be produced. In addition, the torsional stresses on the shafts which serve to control the orientation are very considerable, especially due to the force of the wind. One is thus induced to give the structure very large dimensions in order to withstand these stresses. Finally, since the movement of the shafts for positioning the heliostat must be very accurate, very advanced gearing-down systems are required for transmitting a very high torque.

It is also known to use mountings comprising a swivel joint, which firstly make it difficult to achieve high accuracy, since all the mechanical forces are transmitted to the swivel joint and which on the other hand, have the drawback of making the orientation by motors more difficult, since it is necessary to use a system comprising toothed rings for transmitting the movement. These mountings are frequently used for radar systems.

Finally, it is known to set up a system of mirrors of small dimension on a rotating plate (for the orientation as regards azimuth), each mirror being able to be orientated as regards altitude by a system of rods. The drawback of this system is that the reflecting surface of the mirrors is poorly utilised; in fact, for certain positions of the sun, the mirrors arranged in rows cast shadows one on the other.

To overcome the drawbacks of the known structures, the present invention proposes a heliostat having a pyramidal structure, with a pivoting rigid horizontal base for orientation as regards azimuth and a support which is oblique with respect to the base, the support having a variable length in order to achieve orientation as regards altitude of a reflecting panel fixed firstly to the horizontal base and secondly to the oblique support.

This structure has the advantage of good mechanical rigidity to the forces to which the heliostat is subjected, i.e. to the weight of the reflecting panel resting on the pyramidal structure and to the action of the wind on this surface.

The torsional stresses of the reflecting panel are eliminated by the rigid triangular arrangement of the base, the reflecting panel being connected to this base by a pivot having a horizontal axis.

The forces due to the wind are exerted on the oblique support which is under compressive stress and not bending stress and the rigidity of the structure is thus optimised.

In addition, the attachment of the reflecting panel to an oblique bar of variable length facilitates complete retraction of the panel when the wind is too violent.

Another advantage of the arrangement according to the invention is that it makes it possible to minimise the quantity of material used for producing a heliostat of given dimensions. In fact, the support structure for the heliostat is limited to a base constituted by three welded tubes, an oblique support bar and connecting members at each end.

More precisely, the heliostat according to the invention comprises a tubular chassis having a triangular base, mounted to pivot about a substantially vertical axis and provided with an oblique support mounted at a point of the triangular base in order to pivot about a horizontal axis, means for the pivotal attachment of a reflecting panel to the base, sliding securing means on the oblique bar for fixing the panel to the latter and thus orientating the latter as regards altitude and means for supporting the chassis so that the latter is able to roll on a circular track for orientation as regards azimuth.

The reflecting panel is constituted by an arrangement of metal girders in the form of a lattice for example.

Further features and advantages of the invention will become apparent from the ensuing detailed description which is given with reference to the accompanying drawings which show the heliostat according to the invention in perspective.

This figure shows the structure of the heliostat, constituted essentially in the form of a tetrahedron, the height of whose vertex is adjustable in order to give the reflecting surface an inclination as regards altitude and whose base may pivot about a vertical axis to produce a variable orientation as regards azimuth.

The reflecting surface of the heliostat is that of a mirror 20 constituted either by a panel of silvered glass or, if it is desired that the reflecting surface is not flat, by a mosaic of sheets of silvered glass orientated individually to produce a slightly convergent reflecting surface (spherical or parabolic surface).

These plates are mounted on a metal frame in the form of a three-dimensional grid or trellis, capable of supporting their weight. This frame is not shown in detail.

The tetrahedral structure supporting the mirror comprises a triangular base whereof the three apexes A, B and C are located essentially in a horizontal plane. The apex A is a fixed pivot whereas the apexes B and C are movable and mounted on rollers 22 and 24 which are guided along a rail or circular track 26 to facilitate orientation of the heliostat as regards azimuth.

The fourth apex D is able to move along an oblique support bar 28 to facilitate orientation as regards altitude. This mobility is achieved by sliding, the mirror being fixed at its upper part to a chain (or cable) which moves along the bar 28 and which is driven by a motor located at the bottom of this bar.

The panel 20 is moreover supported at A and B by two bearings, about which it is able to pivot when the apex D varies along the bar 28.

The structure of the heliostat is thus as follows: three connected tubes 30, 32, 34 forming a base, a pivot on a vertical axis and a bearing on a horizontal axis at A, a roller 22 and another bearing at B, for supporting the frame of the reflecting surface 20, a roller 24 at C and means for raising the top of the mirror along a tube 28.

One of the rollers, for example 24, is driven in order to move the base around the circular track.

Furthermore, the heliostat according to the invention comprises an auxiliary mirror 36, whose orientation is slightly offset with respect to the main mirror 20, in order to reflect the solar radiation in a direction which is not exactly that of the boiler. The auxiliary mirror 36 is integral with the frame which supports the main mirror, such that its orientation is permanently representative of the orientation of the main mirror. Thus, the light spot reflected by the auxiliary mirror may serve to guide the heliostat in order to orientate the latter towards the boiler.

The three tubes of the base 30, 32, 34 are of square or circular section and are welded to connecting members (for example made of injected cast iron): at A, the member comprises a flange 40 (for a vertical pivot 42 fixed to the ground) and a bearing for supporting the mirror. At B, an identical bearing 44 is provided and can be seen more clearly. These two bearings facilitate rotation of the reflecting surface 20 of the heliostat for its orientation as regards altitude. A shaft for the wheel 22 is also provided in the connecting member at B and this is also the case for the member at C, which also supports the pivot for the bar 28.

The track 26 for the base of the heliostat is preferably made of concrete and it comprises a reference code 45 for the orientation of the structure as regards azimuth. The usefulness of this code becomes apparent when one wishes to know the exact position of the heliostat as regards azimuth.

The code is optical for example with a pitch of 4cm if it is desired to know the position to within $0.5 \times 10^{-2}$ radian for a length of tube 34 of approximately 8 meters. An optical reading member 46 moves with one of the wheels (wheel 22 at B for example) in order to register the position of the heliostat.

In practice, the code is constituted by several coded tracks printed or painted along the roller track. This arrangement which facilitates absolute coding (and not relative or incremental coding of the position) is necessary if one wishes to eliminate positioning errors due to counting errors.

The optical reading device is an arrangement of photoelectric cells located in the region of each track.

At C, a driving wheel 24 is able to move the arrangement stepwise. The value of the steps depends on the desired positioning accuracy.

The oblique support bar 28 which facilitates orientation as regards altitude is also fixed at C. This bar 28 comprises a system having an endless chain or cable which slides along the bar. The frame supporting the reflecting surface 20 is fixed to the chain (at D).

In the same manner as for the positioning as regards azimuth, the positioning as regards altitude is undertaken in steps of 3mm if the height of the reflecting surface is 6 meters, to obtain an accuracy of $0.5 \times 10^{-3}$ radian.

The motors for producing positioning as regards altitude and azimuth are asynchronous motors followed by appropriate reduction gearing in order that one step corresponds to several revolutions of the motor (for example 200).

An optical reading device 47 registers the displacement as regards altitude with respect to an optical code 48 inscribed along the length of the bar 28. Like the azimuth code 45, the altitude code 48 is inscribed or printed on the bar 28 in the form of several parallel tracks facilitating absolute coding.

Finally, it may be necessary to place a counterweight (made of concrete) at C, for the case where the mirror 20 is practically vertical and where the wind blows from behind the mirror.

What we claim is:

1. A heliostat comprising a chassis having a horizontal triangular base and a reflecting panel mounted on the chassis, said triangular base being mounted for pivotal movement about a substantially vertical axis and having wheels for supporting said base in said movement, an oblique support pivotably attached at one apex of said triangular base so that it can pivot about a horizontal axis parallel to a side of the triangular base which is opposite to said apex, slidable securing means slidable along said oblique support for fixing said panel to said support at a variable distance along said support, means for pivotably attaching one side of said panel to said side of said triangular base so that it can pivot about said triangular base side, means for controlling the rotation of said triangular base, and means for controlling the movement of said slidable securing means whereby said panel can be oriented in altitude as well as in azimuth.

2. A heliostat according to claim 1, wherein said triangular base is mounted on a vertical pivot at one apex of said base.

3. A heliostat according to claim 1, wherein at least one of said wheels is a driving wheel, and said means for controlling the rotation of said base comprises a motor connected to said driving wheel.

4. A heliostat according to claim 1, wherein a circular track is provided for supporting and guiding said wheels of said triangular base.

5. A heliostat according to claim 1, wherein said chassis has
   (a) a first member comprising a flange for a vertical pivot for said base and a first bearing for said reflecting panel at a first apex of said base,
   (b) a second member comprising a shaft for supporting one of said wheels and a second bearing for said reflecting panel at a second apex of said base, and
   (c) a third member comprising a horizontal pivot shaft for said oblique support and a shaft for another of said wheels at a third apex of said base.

* * * * *